(12) United States Patent
Kivity et al.

(10) Patent No.: US 8,560,758 B2
(45) Date of Patent: Oct. 15, 2013

(54) MECHANISM FOR OUT-OF-SYNCH VIRTUAL MACHINE MEMORY MANAGEMENT OPTIMIZATION

(75) Inventors: Avi Kivity, Tel Aviv (IL); Marcelo Tosatti, Porto Alegre (BR)

(73) Assignee: Red Hat Israel, Ltd., Raanana (IL)

( * ) Notice: Subject to any disclaimer, the term of this patent is extended or adjusted under 35 U.S.C. 154(b) by 867 days.

(21) Appl. No.: 12/546,437

(22) Filed: Aug. 24, 2009

(65) Prior Publication Data

US 2011/0047546 A1 Feb. 24, 2011

(51) Int. Cl.
*G06F 21/00* (2013.01)

(52) U.S. Cl.
USPC ........................................ 711/6; 711/E12.014

(58) Field of Classification Search
None
See application file for complete search history.

(56) References Cited

U.S. PATENT DOCUMENTS

| | | | |
|---|---|---|---|
| 6,907,600 B2 | 6/2005 | Neiger et al. | |
| 7,395,405 B2 | 7/2008 | Anderson et al. | |
| 2006/0174053 A1* | 8/2006 | Anderson et al. | 711/6 |
| 2006/0259734 A1* | 11/2006 | Sheu et al. | 711/203 |
| 2008/0040565 A1* | 2/2008 | Rozas et al. | 711/163 |
| 2009/0006714 A1* | 1/2009 | Durham et al. | 711/6 |
| 2009/0313445 A1* | 12/2009 | Pandey et al. | 711/162 |
| 2009/0327575 A1* | 12/2009 | Durham et al. | 711/6 |

OTHER PUBLICATIONS

Intel, "TLBs, Paging-Structure Caches, and Their Invalidation", Doc. No. 317080-001, Apr. 2007 (pp. 1-30).
"Virtualization of System Resources", vol. 3, pp. 27-1 thru 27-13.

* cited by examiner

*Primary Examiner* — Edward Dudek, Jr.
*Assistant Examiner* — Sean D Rossiter
(74) *Attorney, Agent, or Firm* — Lowenstein Sandler LLP

(57) ABSTRACT

In one embodiment, a mechanism for out-of-synch virtual machine memory management optimization is disclosed. In one embodiment, a method for out-of-synch virtual machine memory management optimization includes receiving a memory management unit (MMU) synchronization event issued from a VM virtualized by a VM monitor (VMM) of a host server device, and synchronizing one or more unsynchronized page tables (PTs) of a shadow PT hierarchy maintained by the VMM with one or more corresponding guest PTs of a guest PT hierarchy maintained by the VM, wherein the one or more unsynchronized PTs include an unlimited number of unsynchronized PTs in a visible address space of the shadow PT hierarchy that is determined by a current CR3 register address of the shadow PT hierarchy.

20 Claims, 5 Drawing Sheets

MECHANISM FOR OUT-OF-SYNCH VIRTUAL MACHINE MEMORY MANAGEMENT OPTIMIZATION

TECHNICAL FIELD

The embodiments of the invention relate generally to virtual machine systems and, more specifically, relate to a mechanism for out-of-synch virtual machine memory management optimization.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Recently, solutions providing centralized hosting for VMs that run (virtual) desktops have been developed. Such solutions consist of centralized servers that are partitioned into multiple VMs that host the virtual desktops, thereby providing a desktop for each user. The centralized hosting provides the manageability of sever-based computing, while the dedicated environment provides the flexibility and compatibility with applications that a desktop enables. In general, VMs therefore enable remote access to a host or server computer by a remote client computer, which mimics or reconstructs the events taking place on the host computer.

However, one problem that arises with such centralized hosting of VMs is that each VM hosted by a centralized server expects to maintain control over address-translation operations and have to ability to allocate physical memory, provide protection from and between guest applications, use a variety of paging techniques, and so on. Yet, in the virtualized environment of centralized hosting of VMs, the VMM should be able to have ultimate control over the server's resources to provide protection from and between the VMs.

Mechanisms exist that allow each guest VM to control address translation while enabling the VMM to retain ultimate control over address translation and computer resources accessed by the guest VMs. The VMM has its own virtual memory management unit (MMU) implementation to provide translation services between the guest VMs and the server's own physical hardware MMU implementation. The complexity of managing the many layers of address translation is time and resource consuming. For instance, each VM may update its page table hierarchy frequently. These updates should be reflected at the VMM in its MMU implementation. Yet, requiring the VMM MMU implementation to synchronize each page update performed by each VM at the moment the update takes place is burdensome and creates large overhead costs, as there are many updates to be tracked.

As such, a mechanism to support and streamline the VMM's MMU implementation in providing translation services between guest VMs and the host physical MMU implementation would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for out-of-synch virtual machine memory management optimization. In one embodiment, a method of out-of-synch virtual machine memory management optimization includes receiving a memory management unit (MMU) synchronization event issued from a VM virtualized by a VM monitor (VMM) of a host server device, and synchronizing one or more unsynchronized page tables (PTs) of a shadow PT hierarchy maintained by the VMM with one or more corresponding guest PTs of a guest PT hierarchy maintained by the VM, wherein the one or more unsynchronized PTs include an unlimited number of unsynchronized PTs in a visible address space of the shadow PT hierarchy that is determined by a current CR3 register address of the shadow PT hierarchy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Embodiments of the invention provide for a mechanism for out-of-synch virtual machine memory management optimization. Embodiments of the invention provide an optimized mechanism for a virtual machine monitor (VMM) to evaluate synchronization events and synchronize their shadow page-table (PT) hierarchies with the current guest virtual machine (VM) state in an optimized manner. In one embodiment, whenever a synchronization event occurs, the VMM only synchronizes those PTs in the visible address space of the current guest PT hierarchy that caused the synchronization event. In one embodiment, the visible address space of the current guest PT hierarchy includes all PTs that are rooted to the loaded base address of the guest PT hierarchy. In other words, all PTs associated with the current CR3 register value of the shadow PT hierarchy are synchronized upon any synchronization event.

Figure 1:
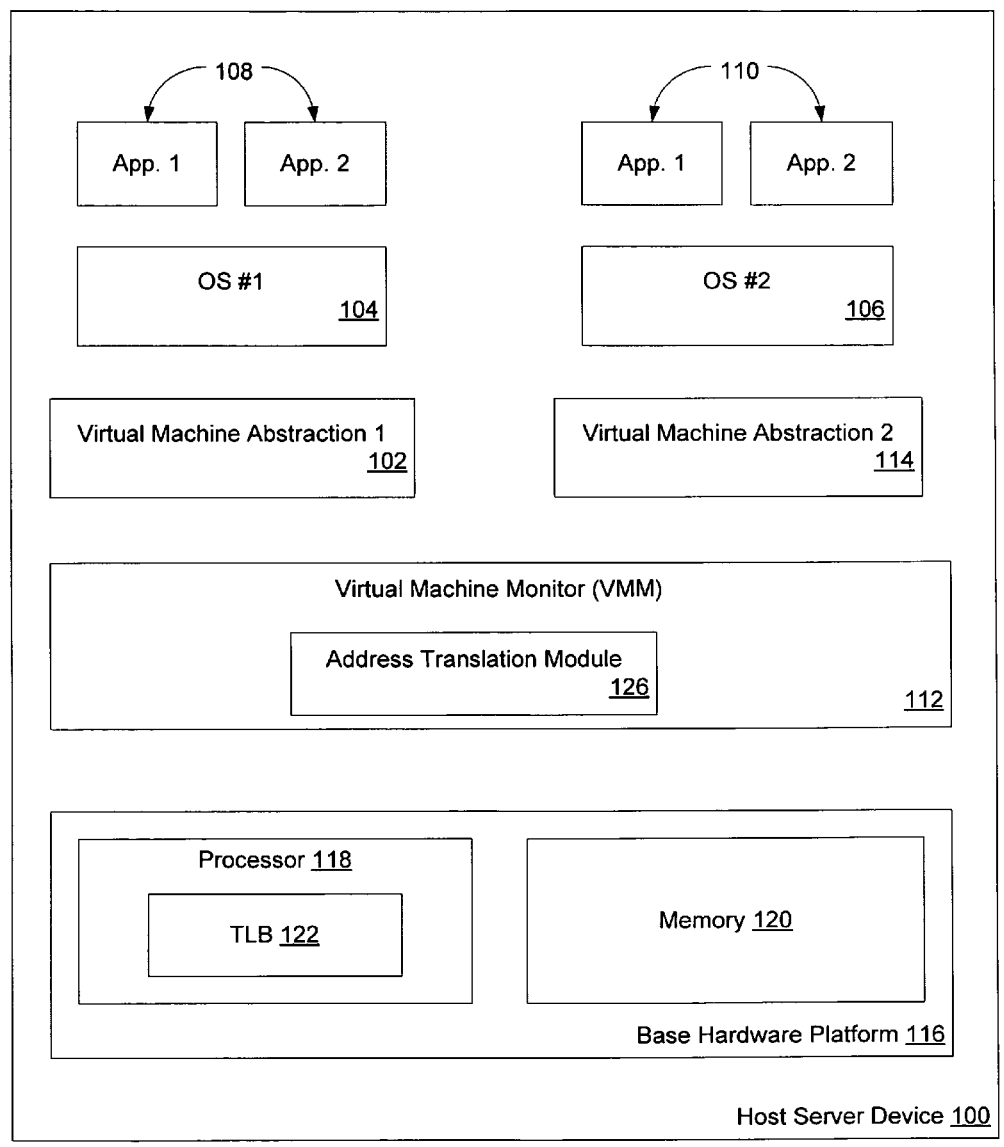
FIG. 1 is a block diagram of one embodiment of a virtual machine (VM) environment that employs a virtual machine monitor (VMM)

FIG. 1 illustrates one embodiment of a VM host server device 100, which employs a virtual-machine monitor (VMM) 112 to perform out-of-synch VM memory management optimization. As illustrated, base platform hardware 116 comprises a computing platform, which may be capable, for example, of executing a standard operating system (OS) or a virtual-machine monitor (VMM), such as VMM 112. In some embodiments, base hardware platform 116 may include a processor 118, memory devices 120, network devices, drivers, and so on. VMM 112 virtualizes the physical resources of the base hardware platform 116 for one or more VMs 102, 114 that are hosted by the server device 100 having the base hardware platform 116. In some embodiments, VMM 112 may also be referred to as a hypervisor, a kernel-based hypervisor (e.g., Kernel-based VM (KVM)), or a host OS.

In one embodiment, each VM 102, 114 includes a guest operating system (OS), such as guest OS 104 or 106, and various guest software applications 108-110. Each guest OS 104, 106 expects to control access to physical resources (e.g., memory and memory-mapped I/O devices) within the hardware platform on which the guest OS 104, 106 is running and to perform other functions. For instance, during address-translation operations, the guest OS expects to allocate physical memory, provide protection from and between software applications (e.g., applications 108 or 110), use a variety of paging techniques, etc. However, in the VM environment provided by host server device 100, VMM 112 should be able to have ultimate control over the physical resources to provide protection from and between VMs 102, 114. This conflict between the expectations of the guest OS and the role of the VMM becomes an issue during address-translation operations initiated by the VM.

In a non-VM environment, an address translation mechanism expected by an OS may be based on a translation lookaside buffer (TLB) 122 controlled by the processor 118 and a translation data structure, such as a page-table (PT) hierarchy, controlled by the OS and used to translate virtual memory addresses into physical memory addresses when paging is enabled. The processor 118 may be able to support a number of paging modes. The most commonly used paging mode supports a 32-bit linear address space using a two-level hierarchical paging structure (referred to herein as a two-level hierarchy paging mode). Embodiments of the invention are not limited to this paging mode, but instead may be employed by one skilled in the art to virtualize other paging modes (e.g., Physical Address Extension (PAE) mode, INTEL Extended Memory 64 Technology (EM64T) mode, etc.) and implementations (e.g., hashed page tables).

Generally, translation of a virtual memory address into a physical memory address begins with searching the TLB 122 using either the upper 20 bits (for a 4 KB page frame) or the upper 10 bits (for a 4 MB page frame) of the virtual address. If a match is found (a TLB hit), the upper bits of a physical page frame that are contained in the TLB 122 are conjoined with the lower bits of the virtual address to form a physical address. The TLB also contains access and permission attributes associated with the mapping. If no match is found (a TLB miss), the processor consults the PT hierarchy to determine the virtual-to-physical translation, which is then cached in the TLB 122. Entries in the PT hierarchy may include some attributes that are automatically set by the processor on certain accesses.

If the PT hierarchy is modified, the TLB 122 may become inconsistent with the PT hierarchy if a corresponding address translation exists in the TLB 122. The OS may expect to be able to resolve such an inconsistency by issuing an instruction to the processor 118. For example, in one embodiment, the processor 118 allows software to invalidate cached translations in the TLB 122 by issuing an INVLPG instruction. In addition, the OS may expect to request the processor 118 to change the address space completely, which should result in the removal of all translations from the TLB 122. For example, an OS may use a MOV instruction or a task switch to request a processor to load the CR3 (which contains the base address of the PT hierarchy), thereby invalidating all translations from the TLB except those for global pages.

Different levels of the page table hierarchy may have different names based upon mode and implementation. In the two-level hierarchy paging mode, there are two levels of paging structures. The CR3 register points to the base of the page directory page. Entries in the page directory may either specify a mapping to a large-size page (e.g., a 4 MB superpage, a 2 MB superpage, 1 GB superpage, etc.), or a reference to a page table. The page table in turn may contain mappings to small-size pages.

As discussed above, in the VM environment provided by host server device 100, the VMM 112 should be able to have ultimate control over physical resources including the TLB 122. Embodiments of the present invention address the conflict between the expectations of the VMs 102 and 114 and the role of the VMM 112 by using a virtual TLB that emulates the functionality of the processor's physical TLB 122. In one embodiment, the VMM 112 includes an address translation module 126 that is responsible for creating and maintaining the virtual TLB, which is described in detail below in FIG. 2.

Figure 2:
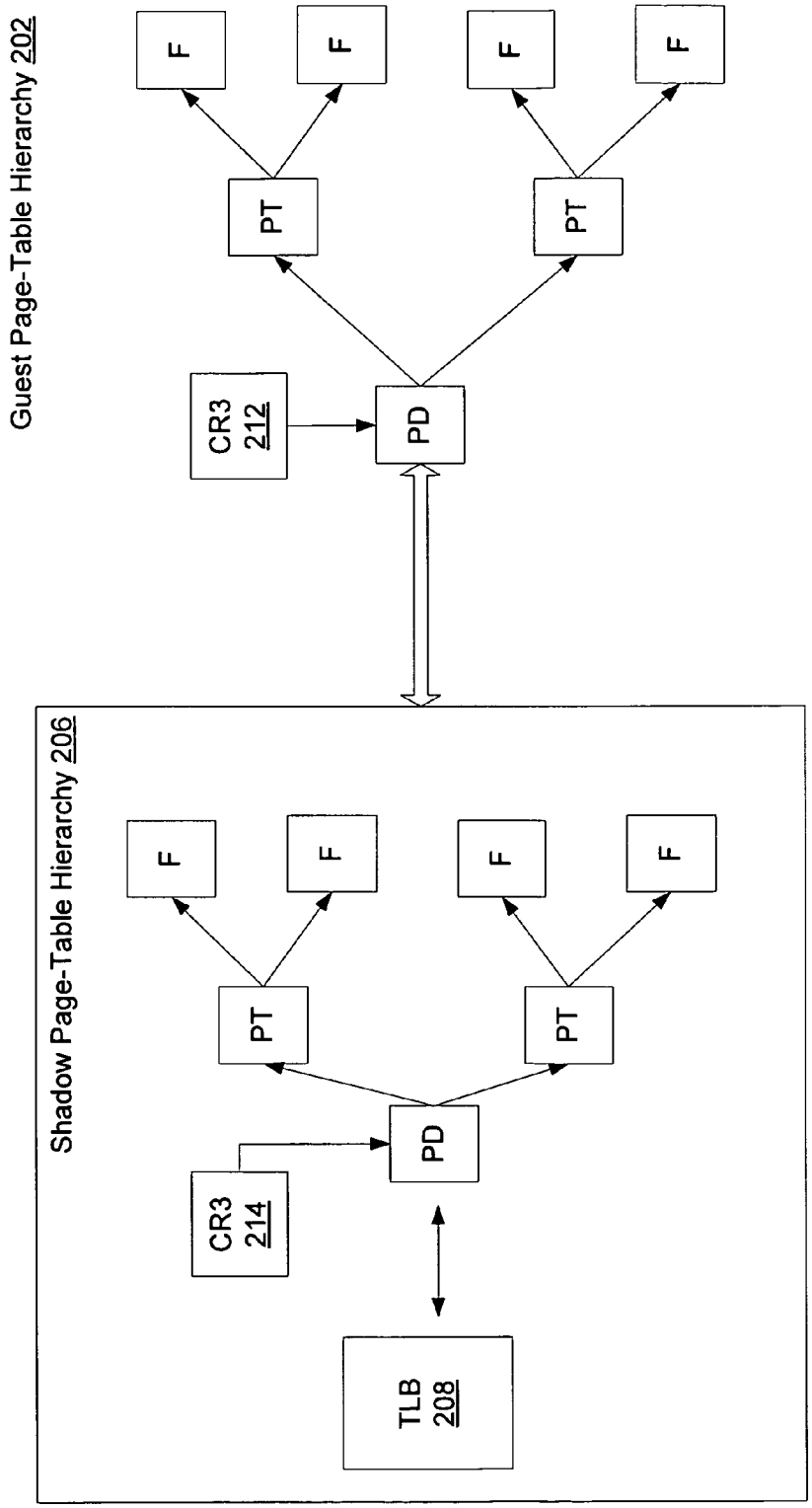
FIG. 2 is a block diagram of illustrating operation of a virtual translation look-aside buffer (TLB) according to an embodiment of the invention.

FIG. 2 is a block diagram illustrating operation of a virtual TLB 204 according to an embodiment of the present invention. In one embodiment, virtual TLB 204 is maintained by address translation module 126 of VMM 112 described with respect to FIG. 1. Virtual TLB 204 includes a shadow translation data structure represented by a shadow PT hierarchy 206 and a physical TLB 208. The shadow PT hierarchy 206 derives its structure and content from a guest translation data structure represented by a guest PT hierarchy 202. In one embodiment, each PT hierarchy 202, 206 includes a page directory (PD), a set of page tables (PTs), and multiple page frames (Fs).

One skilled in the art will appreciate that the PT hierarchies 202, 206 may be structured differently than depicted and are not necessarily limited to the present description. Furthermore, page table hierarchies and their typical features and functionality are well known by those skilled in the art. Typically, one or more guest PT hierarchies 202 are maintained by each VM that is virtualized by the VMM, with each guest PT hierarchy 202 associated with an active process or context of the VM. In turn, the VMM maintains a working set of shadow PT hierarchies for each guest PT hierarchy of each VM it virtualizes.

When a VM requests its processor (i.e., its emulated processor) to enable a different guest PT hierarchy (e.g., by issuing MOV to CR3 or MOV to CR4), control transitions to the VMM, which instructs the processor to load the base address of a shadow PT hierarchy 206 corresponding to the requested guest PT hierarchy 202. In one embodiment, the base address of a PT hierarchy 202, 206 is stored in the CR3 register 212, 214.

VMs are allowed to freely modify their own guest PT hierarchy 202 including changing virtual-to-physical mapping, permissions, etc. Accordingly, the shadow PT hierarchy 206 may not be always consistent with the guest PT hierarchy 202. When a problem arises from an inconsistency between the hierarchies 202 and 206, the guest OS of the VM, which treats the virtual TLB 204 as a physical TLB, attempts to change the virtual TLB 204 by requesting a processor to perform an operation, such as a MOV to CR3, paging activation (modification of CR0.PG), modification of global paging (toggling of the CR4.PGE bit), etc. The operations attempting to change the virtual TLB 204 are configured by the VMM as privileged (e.g., using corresponding execution controls stored in the VMCS), and, therefore, result in a VM exit to the VMM.

Upon an exit to the VMM, the VMM determines the cause of the VM exit and modifies the content of the shadow PT hierarchy 206, if necessary. For example, if the VM exit occurs due to a page fault that should be handled by the guest OS (e.g., a page fault caused by an access not permitted by the guest PT hierarchy 202), the page fault is injected to the guest OS of the VM for handling. Alternatively, if the VM exit occurs due to a page fault (or any other operations such as INVLPG) resulting from an inconsistency between the entries of the hierarchies 202 and 206, the VMM may need to remove stale entries, add new entries, or modify existing entries, via a synchronization operation as will be discussed in more detail below. Page faults caused by the guest PT hierarchy are referred to herein as 'real' page faults, and page faults that would not have occurred with direct usage of the guest page tables are referred to herein as 'induced' page faults.

Embodiments of the invention provide an optimized mechanism for the VMM to evaluate synchronization events and synchronize the shadow PT hierarchy with the current guest VM state in an optimized manner. In one embodiment, the virtual TLB 204 maintains an unsynchronized bitmap ("unsync bitmap") for its associated guest PT hierarchy 202.

Figure 3:
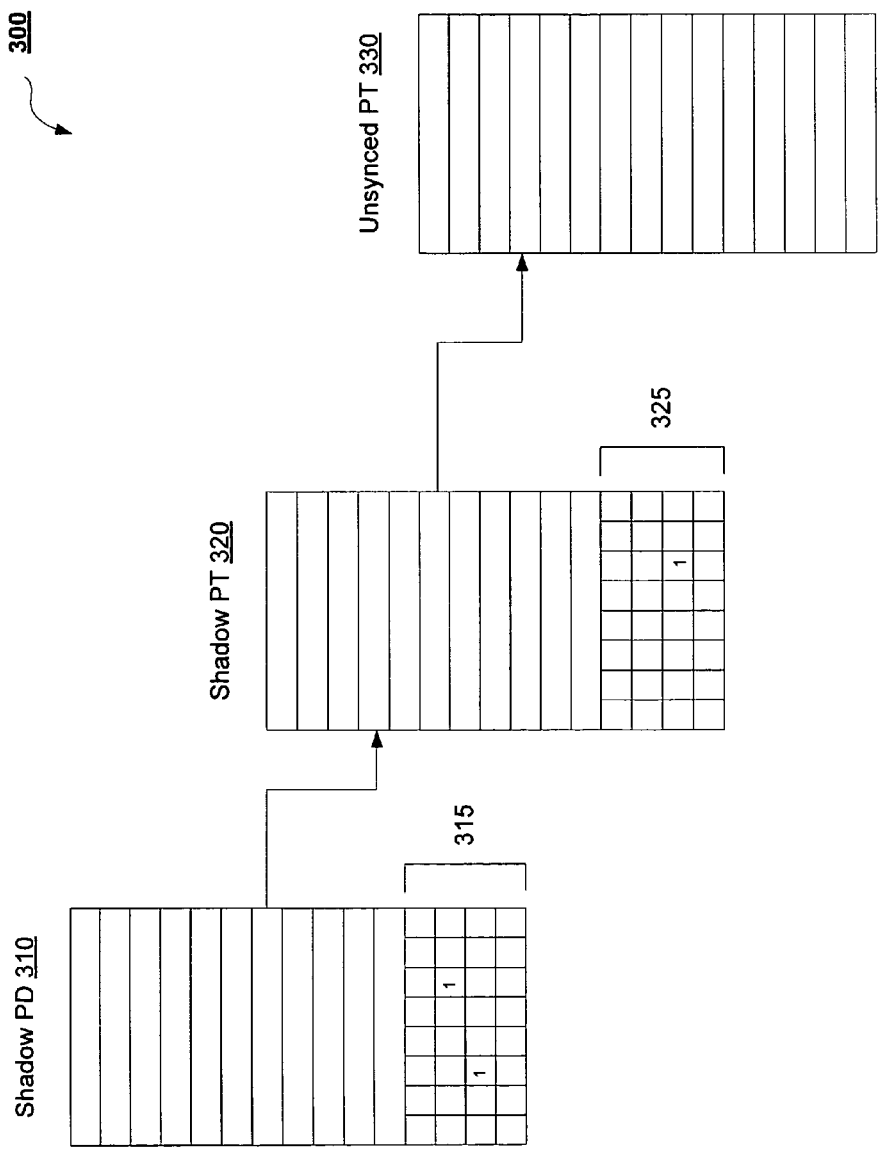
FIG. 3 is a block diagram of a page-table (PT) hierarchy utilizing unsync bitmaps for optimized synchronization according to an embodiment of the invention.

FIG. 3 is a block diagram depicting a PT hierarchy 300 utilizing unsync bitmaps for optimized synchronization according to an embodiment of the invention. In one embodiment, PT hierarchy 300 is the same as shadow PT hierarchy 206 described with respect to FIG. 2. PT hierarchy 300 is shown with three PTs 310, 320, 330. In some embodiments, the PT hierarchy 300 may include more or less levels of PTs, depending on the particular paging implementation utilized by the system implementing the PT hierarchy 300. Embodiments of the invention are not limited to solely a 3-level PT hierarchy. For example, some embodiments of the invention may be implemented in a 4-level PT hierarchy where the highest-level table is a PML4 (page map level 4) table.

As illustrated in FIG. 3, the highest-level PT 310 is a table of pointers to one or more lower-level tables, more specifically to one or more page directory (PD) tables 320. Each entry in the highest-level PT 310 is a pointer to a PD table 320. The PD table 320, in turn, is a table of pointers to one or more PTs 330. All tables in the PT hierarchy 300, except the lowest-level PT 330, include an associated unsync bitmap 315, 325. In one embodiment, the unsync bitmap 315, 325 is a separate structure and is not part of the PT itself. The unsync bitmap includes one or more flags (represented as a bit) that are each associated with an entry in the corresponding PT 310, 320 represented by the particular unsync bitmap 315, 325.

In embodiments of the invention, all pages start as write protected. Any time that a VM attempts to write to a protected page, a page fault occurs and the VM processor marks that page as unsynced in the unsync bitmap 315, 325 of the PT hierarchy 300. Marking a page as unsynced in the unsync bitmap 315, 325 includes setting the bit associated with the PT 330 in the unsync bitmap 325 of the PD 320 referencing the unsynced PT 330. Correspondingly, the bit representing the PD 320 in the higher-level PT 330 is also set. This continues until the highest-level PT 310 is reached in the PT hierarchy 300. Then, the VM processor gives write permission for that page to the VM in order to modify the page as it sees fit.

Returning to FIG. 2, whenever a synchronization event occurs, the VMM only synchronizes those PTs in the visible address space of the current guest PT hierarchy 202 that caused the synchronization event. In one embodiment, the visible address space of the current guest PT hierarchy 202 includes all PTs that are rooted to the loaded base address of the guest PT hierarchy 202. In other words, all PTs associated with the current CR3 register value 212 of the shadow PT hierarchy 202 (which reflects the CR3 register value 212 of the guest PT hierarchy 202) are synchronized upon any synchronization event.

In one embodiment, to synchronize only out-of-sync visible pages, the VMM accesses the unsync bitmap of the base table associated with the current CR3 register 214 of the shadow PT hierarchy 206. This base table address reflects the current base table address of the guest PT hierarchy 202 found in guest CR3 register 212. From the unsync bitmap, the VMM determines the visible out of sync PTs by traversing the unsync bitmap starting at the base table and following set bits down to the lowest-level unsynced PT. Once any out-of-sync PTs are reached, the VMM then determines any changes to the indicated out-of-sync guest PTs and propagates those changes to the corresponding shadow PT. The write permission is then removed from the previously-unsynced PTs of the guest PT hierarchy 202, and the out-of-sync bit is cleared is the unsync bitmap.

Figure 4:
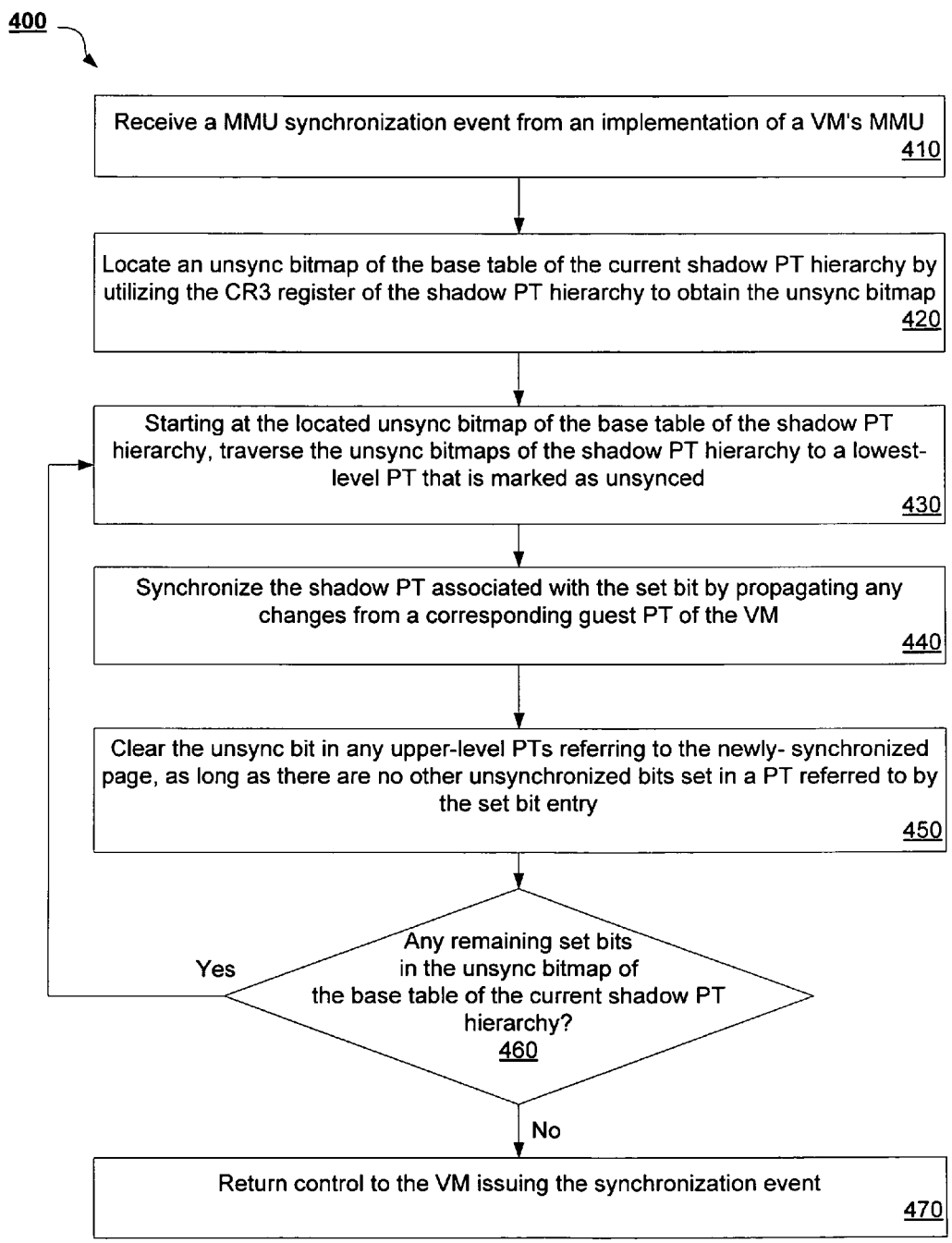
FIG. 4 is a flow diagram illustrating a method for out-of-synch VM memory management optimization according to an embodiment of the invention.

FIG. 4 is a flow diagram illustrating a method 400 for out-of-synch VM memory management optimization according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by VMM 112, and more specifically, address translation module 126 of VMM 112, of FIG. 1.

Method 400 begins at block 410 where an MMU synchronization event is received from an implementation of a VM's MMU. In one embodiment, the synchronization event includes at least one of a MOV to CR3 instruction, paging activation (modification of CR0.PG), and modification of global paging (toggling of the CR4.PGE bit).

Then, at block 420, an unsync bitmap associated with the current guest PT hierarchy that called the synchronization event is located. In one embodiment, the unsync bitmap can be obtained by accessing the base table address of the current shadow PT hierarchy using the shadow CR3 register maintained by the VMM. This CR3 register of the shadow PT hierarchy reflects the guest CR3 register, and therefore base table address of the guest PT hierarchy, maintained at the VM. In one embodiment, the unsync bitmap is maintained in a separate structure than the shadow PT hierarchy itself.

Then, at block 430, the loaded unsync bitmap is traversed, starting at the unsync bitmap of the base table of the shadow PT hierarchy, to a lowest-level PT that is marked as unsynced. For example, the PD referenced by an entry with an unsync bit set in the base table is itself examined for any unsync bits. Then, a PT referenced by an entry with an unsync bit set in the PD is examined. This continues until a lowest-level unsynced PT is reached.

Subsequently, at block 440, the lowest-level unsynced shadow PT associated with a set bit in the unsync bitmap is synchronized with the guest PT hierarchy by propagating any changes from the corresponding guest PT. At block 450, unsync bits in any upper-level PTs referring to the newlysynchronized PT are cleared as long as there are no other unsynchronized bits set in any PTs referred to by the set bit entry.

At decision block, 460, it is determined whether there are any remaining unsync bits set in the unsync bitmap of the base table. If so, then blocks 430 through 450 are repeated until all of the unsync bits in the unsync bitmap of the base table have been cleared. In this way, all PTs associated with the visible address space of a current process or context of a VM that creates a synchronization event are synchronized, leaving any other unsynchronized PTs associated with other processes or contexts of a VM untouched. This is because in embodiments of the invention the current value of the CR3 register (in the shadow and guest PT hierarchies) dictates which PTs are to be synchronized, and the current value of the CR3 is associated with the current process or context utilizing the processor. When all unsync bits in the base table have been cleared, the method 400 returns control back to the VM that issued the synchronization event at block 470.

Figure 5:
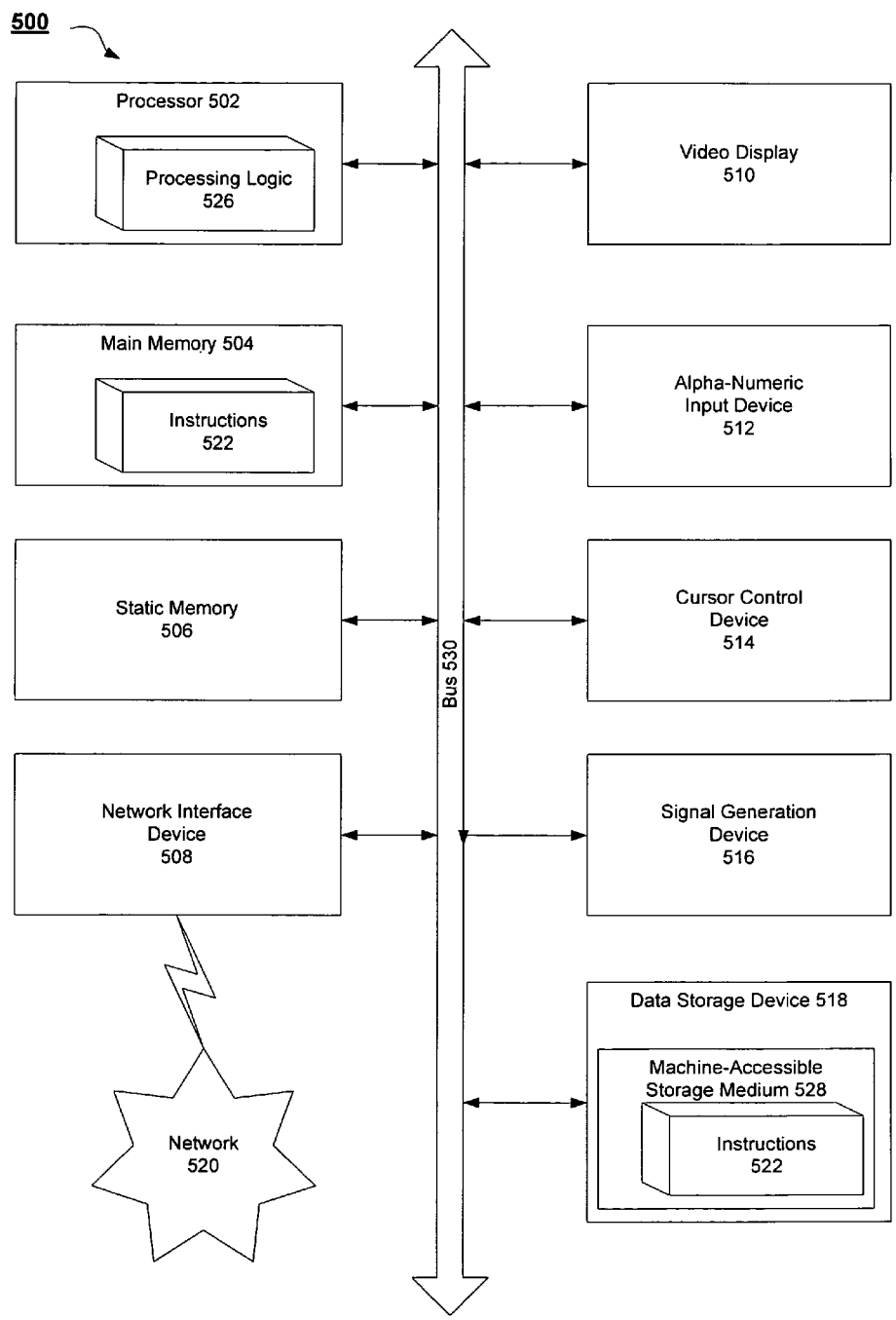
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform method 400 for out-of-synch VM memory management optimization described with respect to FIG. 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description above. In addition, the present invention is not described with reference to any particular programming language. It will be appreciated that a variety of programming languages may be used to implement the teachings of the invention as described herein.

Embodiments of the invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
   receiving, by a virtual machine monitor (VMM) of a host virtual machine (VM) server device, a memory management unit (MMU) synchronization event issued from a VM that is virtualized by the VMM of the host server device;
   identifying, by the VMM, unsynchronized page tables (PTs) of a shadow PT hierarchy maintained by the VMM that are in a visible address space of a guest PT hierarchy that caused the synchronization event, wherein the visible address space of the guest PT hierarchy comprises PTs of the shadow PT hierarchy that are associated with a current CR3 register address of the guest PT hierarchy; and
   synchronizing, by the VMM, the identified unsynchronized with corresponding guest PTs of a guest PT hierarchy maintained by the VM that caused the synchronization event.

2. The method of claim 1, wherein the MMU synchronization event comprises at least one of a MOV to CR3 instruction, modification of CR0.PG, or toggling of a CR4.PGE bit.

3. The method of claim 1, wherein the CR3 register address is a base address of a highest-level PT associated with the shadow PT hierarchy.

4. The method of claim 1, wherein the shadow PT hierarchy comprises a translation look-aside buffer (TLB) that emulates a functionality of a physical TLB of a processor of the host server device to the guest PT hierarchy of the VM.

5. The method of claim 1, wherein synchronizing the one or more unsynchronized PTs comprises:
   traversing the shadow PT hierarchy by examining a bitmap associated with each PT of the shadow PT hierarchy, the bitmap comprising a flag for each entry of the corresponding PT that is set if there is an unsynchronized PT associated with that particular entry;
   when an unsynchronized PT is reached via the traversing, propagating to the unsynchronized PT any changes found in a guest PT that corresponds to the unsynchronized PT; and
   clearing one or more flags in any bitmap referring to the unsynchronized PT, as long as there are no other flags set in a PT referred to by the flag to be cleared.

6. The method of claim 5, further comprising repeating the traversing, propagating, and clearing until all flags in a bitmap of a highest-level PT associated with the current CR3 register address are cleared.

7. The method of claim 5, wherein the bitmap associated with each PT of the shadow PT hierarchy is a separate structure from the PT to which the bitmap refers.

8. The method of claim 1, wherein the VMM maintains a shadow PT hierarchy for each VM virtualized by the VMM.

9. A system, comprising:
   a memory;
   a processing device, communicably coupled to the memory;
   one or more virtual machines (VMs) executed from the memory and sharing use of the processing device; and
   a virtual machine manager (VMM) communicably coupled to the one or more VMs in order to manage the one or more VMs under a kernel-based virtualization model, the VMM operable to:
   receive a memory management unit (MMU) synchronization event issued from a VM of the one or more VMs;
   identify unsynchronized page tables (PTs) of a shadow PT hierarchy maintained by the VMM that are in a visible address space of guest PT hierarchy that caused the synchronization event, wherein the visible address space of the guest PT hierarchy comprises PTs of the shadow PT hierarchy that are associated with a current CR3 register address of the guest PT hierarchy; and
   synchronize the identified unsynchronized PTs with corresponding guest PTs of a guest PT hierarchy maintained by the VM that caused the synchronization event.

10. The system of claim 9, wherein the MMU synchronization event comprises at least one of a MOV to CR3 instruction, modification of CR0.PG, or toggling of a CR4.PGE bit.

11. The system of claim 9, wherein the CR3 register address is a base address of a highest-level PT associated with the shadow PT hierarchy.

12. The system of claim 9, wherein the VMM to synchronize the one or more unsynchronized PTs further comprises the VMM to:
   traverse the shadow PT hierarchy by examining a bitmap associated with each PT of the shadow PT hierarchy, the bitmap comprising a flag for each entry of the corresponding PT that is set if there is an unsynchronized PT associated with that particular entry;

when an unsynchronized PT is reached via the traversing, propagate to the unsynchronized PT any changes found in a guest PT that corresponds to the unsynchronized PT; and clear one or more flags in any bitmap referring to the unsynchronized PT, as long as there are no other flags set in a PT referred to by the flag to be cleared.

13. The system of claim 12, wherein the VMM to synchronize the one or more unsynchronized PTs further comprises the VMM to repeat the traversing, propagating, and clearing until all flags in a bitmap of a highest-level PT associated with the current CR3 register address are cleared.

14. The system of claim 12, wherein the bitmap associated with each PT of the shadow PT hierarchy is a separate structure from the PT to which the bitmap refers.

15. The system of claim 9, wherein the VMM maintains a shadow PT hierarchy for each VM virtualized by the VMM.

16. A non-transitory machine-readable storage medium including data that, when accessed by a processing device, cause the processing device to perform operations comprising:

receiving, by a virtual machine monitor (VMM) of a host virtual machine (VM) server device comprising the processing device, a memory management unit (MMU) synchronization event issued from a VM virtualized by the VMM; identifying, by the VMM, unsynchronized page tables (PTs) of a shadow PT hierarchy maintained by the VMM that are in a visible address space of guest PT hierarchy that caused the synchronization event, wherein the visible address space of the guest PT hierarchy comprises PTs of the shadow PT hierarchy that are associated with a current CR3 register address of the guest PT hierarchy; and synchronizing, by the VMM, the identified unsynchronized PTs with corresponding guest PTs of a guest PT hierarchy maintained by the VM that caused the synchronization event.

17. The non-transitory machine-readable storage medium of claim 16, wherein the MMU synchronization event comprises at least one of a MOV to CR3 instruction, modification of CR0.PG, or toggling of a CR4.PGE bit.

18. The non-transitory machine-readable storage medium of claim 16, wherein the CR3 register address is a base address of a highest-level PT associated with the shadow PT hierarchy.

19. The non-transitory machine-readable storage medium of claim 16, wherein synchronizing the one or more unsynchronized PTs comprises:

traversing the shadow PT hierarchy by examining a bitmap associated with each PT of the shadow PT hierarchy, the bitmap comprising a flag for each entry of the corresponding PT that is set if there is an unsynchronized PT associated with that particular entry;

when an unsynchronized PT is reached via the traversing, propagating to the unsynchronized PT any changes found in a guest PT that corresponds to the unsynchronized PT;

clearing one or more flags in any bitmap referring to the unsynchronized PT, as long as there are no other flags set in a PT referred to by the flag to be cleared; and repeating the traversing, propagating, and clearing until all flags in a bitmap of a highest-level PT associated with the current CR3 register address are cleared.

20. The non-transitory machine-readable storage medium of claim 19, wherein the bitmap associated with each PT of the shadow PT hierarchy is a separate structure from the PT to which the bitmap refers.

* * * * *